US007788249B2

(12) United States Patent
Rotholtz

(10) Patent No.: US 7,788,249 B2
(45) Date of Patent: Aug. 31, 2010

(54) SYSTEM AND METHOD FOR AUTOMATICALLY GENERATING A RESULT SET

(75) Inventor: Ben Aaron Rotholtz, Yarrow Point, WA (US)

(73) Assignee: RealNetworks, Inc., Seattle, WA (US)

( * ) Notice: Subject to any disclaimer, the term of this patent is extended or adjusted under 35 U.S.C. 154(b) by 219 days.

(21) Appl. No.: 11/506,456

(22) Filed: Aug. 18, 2006

(65) Prior Publication Data

US 2008/0046408 A1 Feb. 21, 2008

(51) Int. Cl.
*G06F 17/30* (2006.01)

(52) U.S. Cl. ....................... 707/706; 707/707; 707/708; 707/722

(58) Field of Classification Search ................. 707/3–6, 707/104.1
See application file for complete search history.

(56) References Cited

U.S. PATENT DOCUMENTS

| | | | | |
|---|---|---|---|---|
| 2003/0001880 | A1 | 1/2003 | Holtz et al. | |
| 2004/0111467 | A1* | 6/2004 | Willis | 709/203 |
| 2004/0189707 | A1* | 9/2004 | Moore et al. | 345/777 |
| 2004/0193580 | A1* | 9/2004 | Martin et al. | 707/3 |
| 2004/0193600 | A1 | 9/2004 | Kaasten et al. | |
| 2005/0160107 | A1 | 7/2005 | Liang | |
| 2006/0020591 | A1* | 1/2006 | Kommers et al. | 707/3 |
| 2006/0026147 | A1* | 2/2006 | Cone et al. | 707/3 |
| 2006/0064411 | A1* | 3/2006 | Gross et al. | 707/3 |
| 2006/0136391 | A1* | 6/2006 | Morris | 707/3 |
| 2006/0224729 | A1 | 10/2006 | Rowe et al. | |
| 2007/0027902 | A1 | 2/2007 | Ponte | |
| 2007/0207780 | A1 | 9/2007 | McLean | |
| 2007/0208746 | A1* | 9/2007 | Koide et al. | 707/9 |
| 2007/0255754 | A1* | 11/2007 | Gheel | 707/104.1 |
| 2008/0034374 | A1* | 2/2008 | Davis | 719/314 |
| 2008/0059455 | A1* | 3/2008 | Canoy et al. | 707/5 |

OTHER PUBLICATIONS

Notice of Allowance, U.S. Appl. No. 11/619,042, Rotholtz, Ben Aaron, filed Jan. 2, 2007.

* cited by examiner

*Primary Examiner*—Don Wong
*Assistant Examiner*—Hanh B Thai
(74) *Attorney, Agent, or Firm*—AÆON Law; Adam L. K Philipp

(57) ABSTRACT

A method, computer program product and computing device for automatically generating a result set includes monitoring one or more actions taken by a user while browsing a website. One or more search terms are assigned to each of the one or more actions taken by the user, thus defining one or more initial search terms. An initial query is executed on a datastore based on at least a portion of the one or more initial search terms to generate an initial result set. The initial result set is presented to the user of the website.

20 Claims, 7 Drawing Sheets

150

SYSTEM AND METHOD FOR AUTOMATICALLY GENERATING A RESULT SET

TECHNICAL FIELD

This disclosure relates to the generation of a result set and, more particularly, to the automatic generation of a result set in response to automatically executed queries.

BACKGROUND

When a user browses a website, the actions taken by the user may be indicative of the various likes and dislikes of the particular user. For example, if the browser of a website reviews material concerning a particular type of music, these actions may be indicative of the user being a fan of that type of music. Further, if the browser of a website reviews material concerning a particular political party, these actions may be indicative of the user being a member of/interested in that political party. Accordingly, by monitoring the actions taken by a browser of a website, the particular tastes of the user may be discernible.

SUMMARY OF THE DISCLOSURE

In a first implementation, a method for automatically generating a result set includes monitoring one or more actions taken by a user while browsing a website. One or more search terms are assigned to each of the one or more actions taken by the user, thus defining one or more initial search terms. An initial query is executed on a datastore based on at least a portion of the one or more initial search terms to generate an initial result set. The initial result set is presented to the user of the website.

The details of one or more implementations is set forth in the accompanying drawings and the description below. Other features and advantages will become apparent from the description, the drawings, and the claims.

DETAILED DESCRIPTION OF THE PREFERRED EMBODIMENTS

Figure 1:
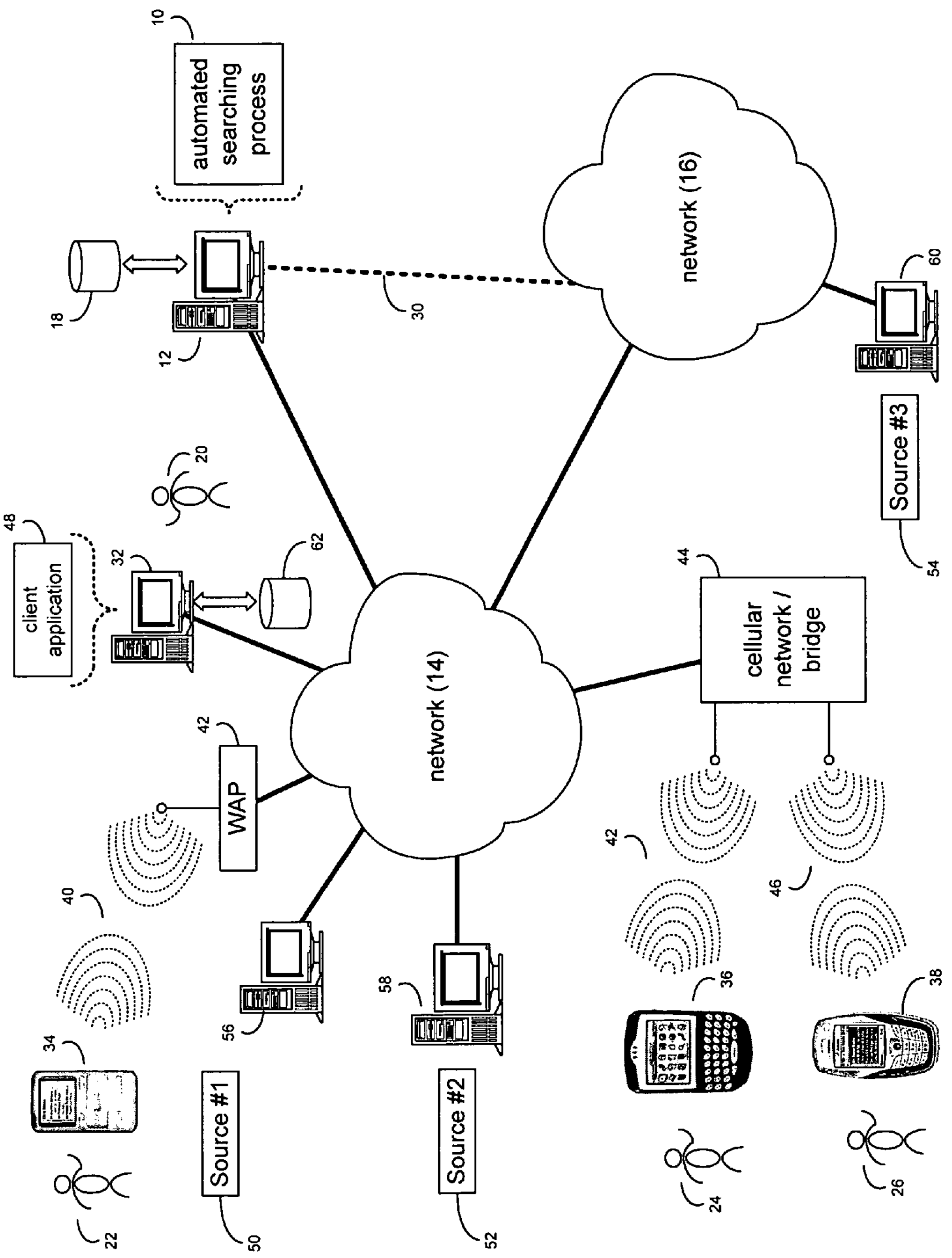
FIG. 1 is a diagrammatic view of an automated searching process and a client application coupled to a distributed computing network.

System Overview:

Referring to FIG. 1, there is shown an automated searching process 10 that may reside on and may be executed by data server 12. As will be discussed below in greater detail, automated searching process 10 may monitor the actions taken by a user of a website and automatically generate a result set based on those monitored actions. Examples of data server 12 may include, but are not limited to, a personal computer, a mini computer, or mainframe computer, for example.

Automated searching process 10 may be a server application that resides on and is executed by data server 12, which may be connected to network 14 (e.g., the Internet). Data server 12 may be a web server (or series of servers) running a network operating system, examples of which may include but are not limited to: Microsoft Windows 2003 Server™; Novell Netware™; or Redhat Linux™, for example.

Data server 12 may also execute a web server application, examples of which may include but are not limited to: Microsoft IIS™, Novell Webserver™, or Apache Webserver™, that allows for HTTP (i.e., HyperText Transfer Protocol) access to data server 12 via network 14. Network 14 may be connected to one or more secondary networks (e.g., network 16), examples of which may include but are not limited to: a local area network; a wide area network; or an intranet, for example.

The instruction sets and subroutines of automated searching process 10, which may be stored on a storage device 18 coupled to data server 12, may be executed by one or more processors (not shown) and one or more memory architectures (not shown) incorporated into data server 12. Storage device 18 may include but is not limited to: a hard disk drive; a tape drive; an optical drive; a RAID array; a random access memory (RAM); or a read-only memory (ROM).

Users 20, 22, 24, 26 may access automated searching process 10 directly through network 14 or through secondary network 16. Further, data server 12 (i.e., the computer that executes automated searching process 10) may be connected to network 14 through secondary network 16, as illustrated with phantom link line 30.

Users 20, 22, 24, 26 may access automated searching process 10 through various client devices, examples of which may include but are not limited to client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), and a portable gaming device (e.g., a Sony Playstation™ Portable, not shown), for example.

The various client devices may be directly or indirectly coupled to network 14 (or network 16). For example, client computer 32 is shown directly coupled to network 14 via a hardwired network connection. Further, personal media device 34 is shown wirelessly coupled to network 14 via wireless communication channel 40 established between personal media device 34 and wireless access point (i.e., WAP) 42, which is shown directly coupled to network 14. WAP 42 may be, for example, an IEEE 802.11a, 802.11b, 802.11g, Wi-Fi, and/or Bluetooth device that is capable of establishing wireless communication channel 40 between personal media device 34 and WAP 42.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Personal digital assistant 36 is shown wirelessly coupled to network 14 via wireless communication channel 42 established between personal digital assistant 36 and cellular network/bridge 44, which is shown directly coupled to network 14. Further, cellular telephone 38 is shown wirelessly coupled to network 14 via wireless communication channel 46 established between cellular telephone 38 and cellular network/bridge 44.

Client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), and a portable gaming device (e.g., a Sony Playstation™ Portable, not shown), may each execute a client application (e.g., client application 48) that interfaces with automated searching process 10 and facilitates the bidirectional transfer of digital content between data sources (e.g., sources 50, 52, 54) and users (e.g., users 20, 22, 24, 26). Examples of data sources 50, 52, 54 include websites that are hosted by e.g., web servers 56, 58, 60, respectively.

Client application 48 may be a web browser (e.g., Microsoft Internet Explorer™ and Netscape Navigator™, for example), a stand alone application, or an applet running within another program (e.g., Microsoft Internet Explorer™ and Netscape Navigator™, for example). Client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), and a portable gaming device (e.g., a Sony Playstation™ Portable, not shown), may each execute an operating system, examples of which may include but are not limited to Microsoft Windows™, Microsoft Windows CE™, Redhat Linux™, or a custom operating system.

The instruction sets and subroutines of client application 48, which may be stored on a storage device (e.g., storage device 62) coupled to e.g., client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), or a portable gaming device (e.g., a Sony Playstation™Portable, not shown), are executed by one or more processors (not shown) and one or more memory architectures (not shown) incorporated into e.g., client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), or a portable gaming device (e.g., a Sony Playstation™ Portable, not shown). Storage device 62 may include but is not limited to a hard disk drive, a tape drive, an optical drive, a RAID array, a random access memory (RAM), or a read-only memory (ROM).

Using client application 48, users 20, 22, 24, 26 may visit one or more websites (e.g., 50, 52, 54) and perform various actions on the website(s). Examples of the various types of websites may include, but are not limited to: news websites (e.g., www.cnn.com, www.foxnews.com); weblog websites (e.g., www.blogspot.com, www.xanga.com); auction websites (e.g., www.ebay.com, www.bidz.com); dating/matchmaking websites (www.eharmony.com, www.match.com); special interest websites (e.g., www.ichef.com, www.imdb.com); search engine/internet portal websites (e.g., www.google.com, www.yahoo.com); ecommerce websites (e.g., www.amazon.com, www.overstock.com); and social networking websites (www.myspace.com, www.classmates.com, www.reunion.com, www.friendster.com).

Examples of the types of actions taken by a user may include, but are not limited to: rendering a media file; uploading a data file; downloading a data file; posting an article; reviewing an article; posting a message; reviewing a message; executing a query; purchasing a product; offering a product for sale; purchasing a service; and offering a service for sale.

Figure 2:
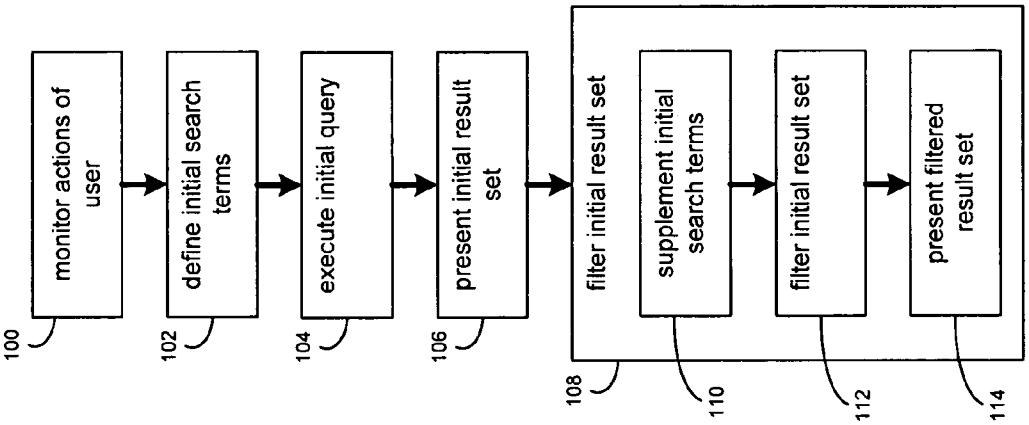
FIG. 2 is a flowchart of a process executed by the automated searching process and/or the client application of FIG. 1.
Figure 3:
FIG. 3 is a diagrammatic view of a screen rendered by the automated searching process and/or client application of FIG. 1.

The Automated Searching Process:

Referring also to FIG. 2, when a user (e.g., user 20) browses a website, automated searching process 10 may monitor 100 one or more actions taken by the user. For example and referring also to FIG. 3, assume that user 20 uses client application 48 to visit a social networking website (e.g., www.myspace.com). Client application 48 may render a webpage 150 that is presented to user 20.

While browsing e.g., the social networking website, user 20 may take one or more actions that (as discussed above) may be monitored 100 by automated searching process 10. For example, user 20 may launch an application (e.g., Rhapsody™ by RealNetworks, Inc. and Windows MediaPlayer™ by The Microsoft Corporation) 152 that e.g., renders media files. For example, application 152 may render audio files, thus allowing user 20 to e.g., listen to music while browsing the website. Additionally/alternatively, application 152 may render video files, thus allowing user 20 to e.g., watch video clips while browsing the website.

Application 150 may be a stand alone application (e.g., Rhapsody™ by RealNetworks, Inc. and Windows MediaPlayer™ by The Microsoft Corporation), or an applet running within another program (e.g., client application 48, for example).

While application 150 is shown to be a media rendering application (e.g., Rhapsody™ by RealNetworks, Inc.), this is for illustrative purposes only and other types of applications are considered to be within the scope of this disclosure. For example, application 150 may be a searching application/applet that allows user 20 to search the content of the website that the user is browsing. For example, if the website is an auction/ecommerce website, application 150 may be a searching application that allows user 20 to search for various products available within the auction/ecommerce website.

Monitoring 100 the actions taken by the user may include, but is not limited to: monitoring the music listened to by user 20 while browsing the website; monitoring the videos watched by user 20 while browsing the website; monitoring the search strings/queries entered by user 20 while browsing the website; monitoring the articles reviewed by user 20 while browsing the website; monitoring the articles posted by user 20 while browsing the website; monitoring the files uploaded by user 20 to the website; monitoring the files downloaded by user 20 from the website; monitoring email/messages received by the user while browsing the website; monitoring email/messages posted by user 20 to the website; monitoring the products researched by user 20 while browsing the website; monitoring the products purchased by user 20 while browsing the website; monitoring the services researched by user 20 while browsing the website; and monitoring the services purchased by user 20 while browsing the website.

Continuing with the above-stated example, once user 20 accesses e.g., the social networking website and launches application 152 to e.g., listen to music, automated searching process 10 may e.g., monitor 100 the music selected and rendered by the user. Automated searching process 10 may assign 102 one or more search terms to each of the actions taken by user 20, thus defining one or more initial search terms. The manner in which automated searching process 100 assigns 102 search terms to the actions taken by user 20 may vary depending on the type of action taken by the user. For example, if the action taken by the user is the rendering of a media file, the search terms assigned 102 to that action may be extracted from and/or based upon the metadata associated with the media file. For example, if user 20 (through application 152) renders a media file for the track "Do I Make You Proud" by Artist "Taylor Hicks", automated searching process 10 may assign 102 one or more of the terms "Do", "I", "Make", "You", "Proud", "Taylor", "Hicks" to the action (i.e., the rendering of the track "Do I Make You Proud" by Artist "Taylor Hicks") taken by user 20, thus defining one or more initial search terms.

Automated searching process 10 may execute 104 an initial query on a datastore based on at least a portion of the initial search terms to generate an initial result set. Examples of the datastore searched may include a database (not shown) servable by e.g., data server 12 and stored on storage device 18. Additionally/alternatively, the datastore may include a system memory (not shown) accessible by data server 12.

Continuing with the above-stated example, after execution 104 of the initial query and generation of the initial result set, automated searching process 10 may present 106 the initial result set to the user (e.g., user 20) of the website. The content/type of the result set may very depending on the type of website being visited and the actions taken by user 20. For example, if the website is a social networking website, the result set generated by automated searching process 10 may include a plurality of users who are members of the social community website and fans of the type of music that the user is listening to. If the website is an auction/ecommerce website, the result set generated by automated searching process 10 may include a plurality of objects offered for bid/for sale on the website that are related to objects being researched/purchased by user 20. Alternatively, if the user is listening to music while browsing the auction/ecommerce website, the result set generated by automated searching process 10 may include objects offered for bid/for sale on the website that are related to the artist being listened to by user 20 or the type of music that the artist plays. If the user is reading an article on a news website, the result set generated by automated searching process 10 may include a plurality of news articles related to (e.g., same author, same topic, same subject) the article being reviewed by user 20. If the user is listening to music while browsing the news website, the result set generated by automated searching process 10 may include news articles related to the artist being listened to by user 20 or the type of music that the artist plays.

Figure 4:
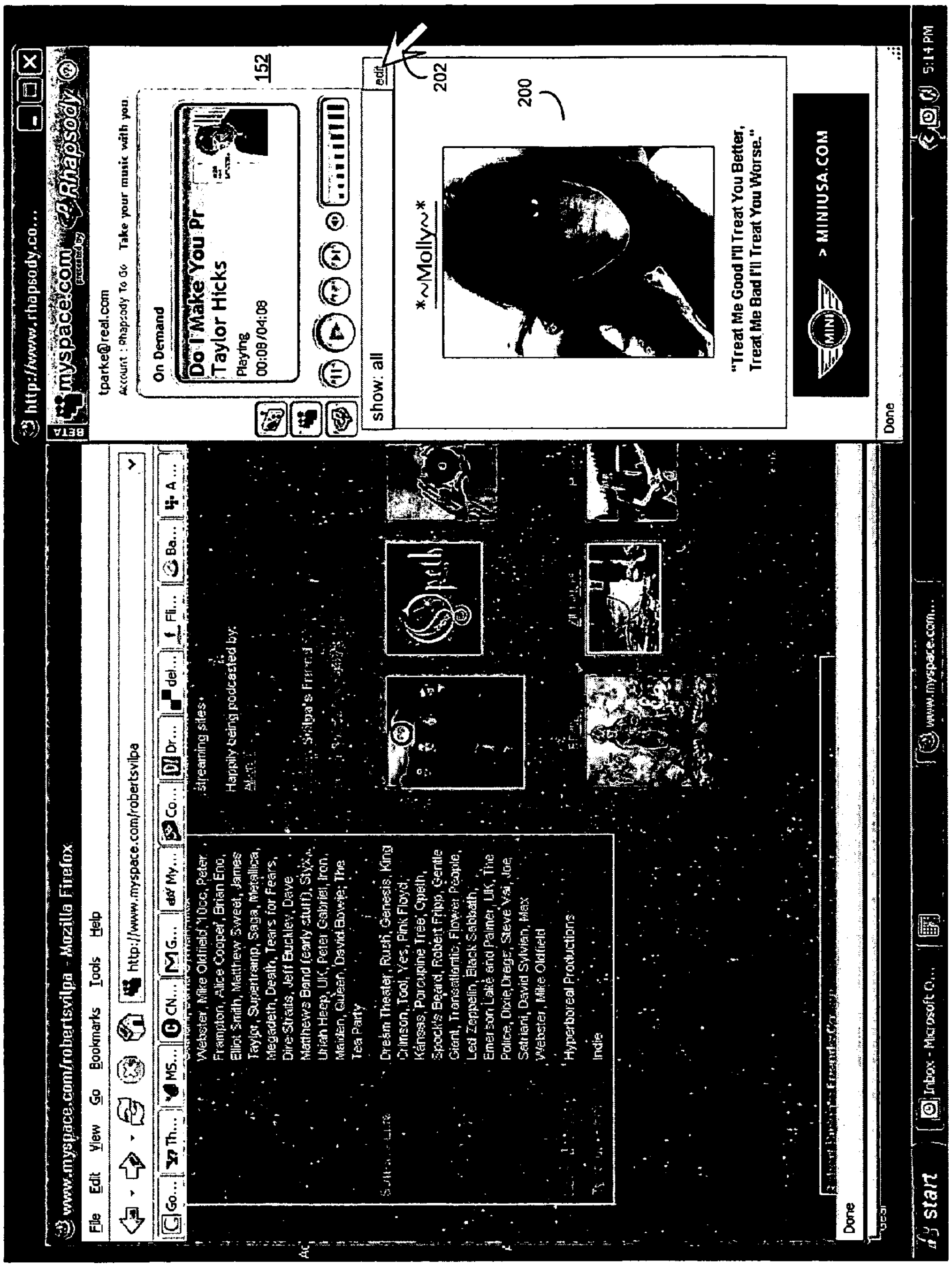
FIG. 4 is a diagrammatic view of a screen rendered by the automated searching process and/or client application of FIG. 1.

Referring also to FIG. 4 and continuing with the above-stated example in which user 20 is listening (using application 152) to the track "Do I Make You Proud" by Artist "Taylor Hicks" while browsing a social networking website, the result set 200 may be generated by automated searching process 10 and presented 106 to user 20. In this particular example, result set 200 is shown to include a member of the social community website named "Molly". However and for this example, as the social community website may have millions of members, it is possible for result set 200 to be overly large and (essentially) unmanageable. Accordingly, automated searching process 10 may allow user 20 to filter 108 initial result set 200 in accordance with filtering criteria defined by user 20. For example, user 20 may e.g., select the "edit" tag using screen pointer 202 (controllable by a pointing device, such as a mouse (not shown)) to enter a query focus screen.

Figure 5:
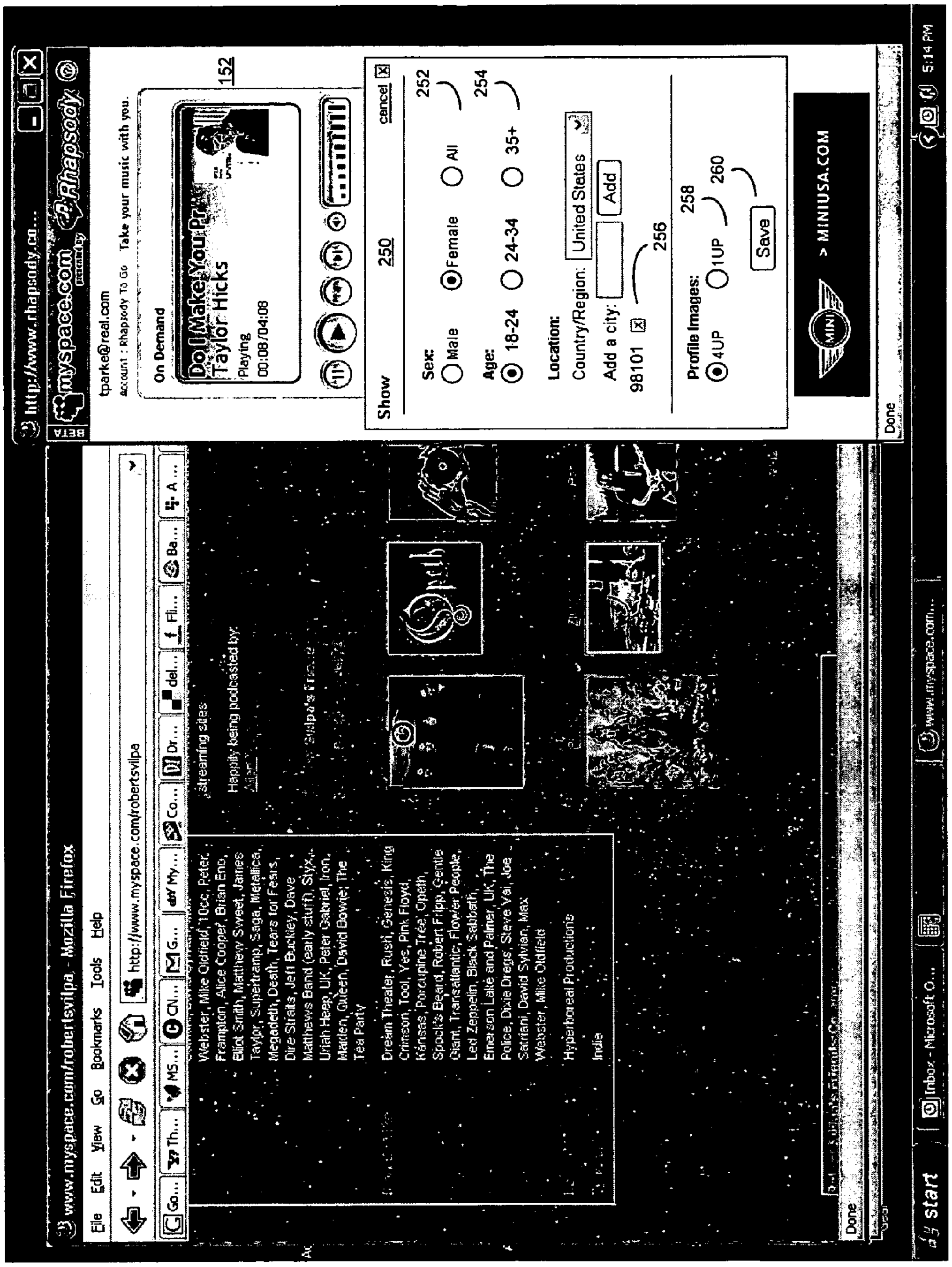
FIG. 5 is a diagrammatic view of a screen rendered by the automated searching process and/or client application of FIG. 1.

Referring also to FIG. 5, through query focus screen 250, automated searching process 10 may allow the user to supplement 110 the initial search terms (e.g., "Taylor" and "Hicks") with one or more user-defined search terms, examples of which may include (but are not limited to) the gender 252 of the members included within the result set, the age group 254 of the members included within the result set, the location 256 of the members included within the result set, and the grouping 258 of the members included within the result set. Once the user has supplemented 110 the initial search terms (e.g., "Taylor", "Hicks") with the user-defined search terms (e.g., "female", "18-24", "98101" and "4U), user 20 may save the "revised" search terms by e.g., selecting the "save" button using e.g., screen pointer 202. Once saved, automated searching process 10 may execute 112 a filtering query based on at least a portion of the user-defined search terms to generate a filtered result set. For example, automated search process may execute a filtering query based on "Taylor", "Hicks", "female", "18-24", "98101" and "4U).

Figure 6:
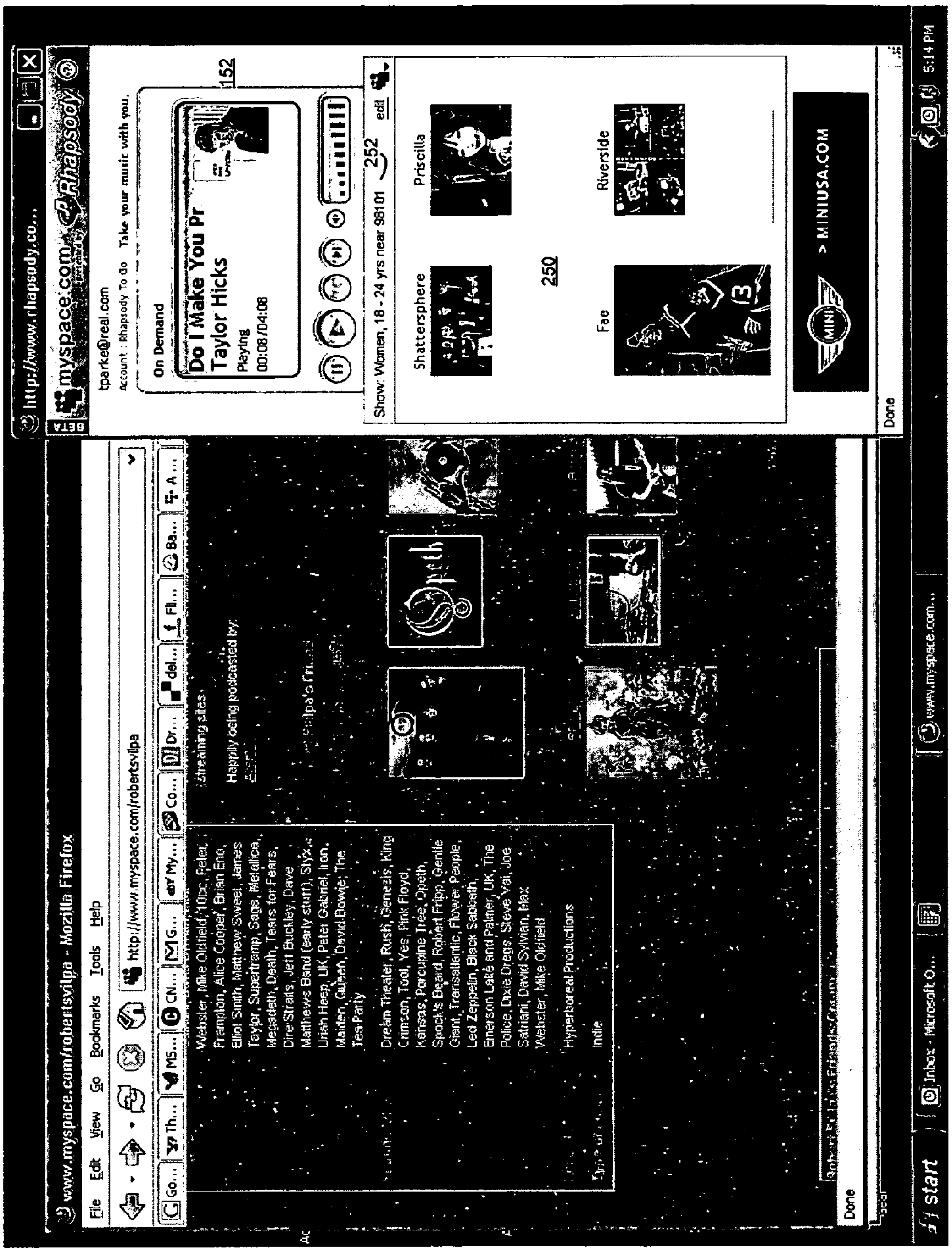
FIG. 6 is a diagrammatic view of a screen rendered by the automated searching process and/or client application of FIG. 1.

Referring also to FIG. 6, automated searching process 10 may present 114 filtered result set 250 to user 20. A filtering criteria indicator 252 may be rendered by automated searching process 10 and may define the manner in which the initial result set was filtered. In this particular example, filtering criteria indicator 252 is defined as "Women, 18-24 yrs near 98101". While the initial result set was shown to include only one member per results set "page", as user 20 selected "4U" (i.e., four members per page"), filtered result set 250 is shown to include four members per "page".

Figure 7:
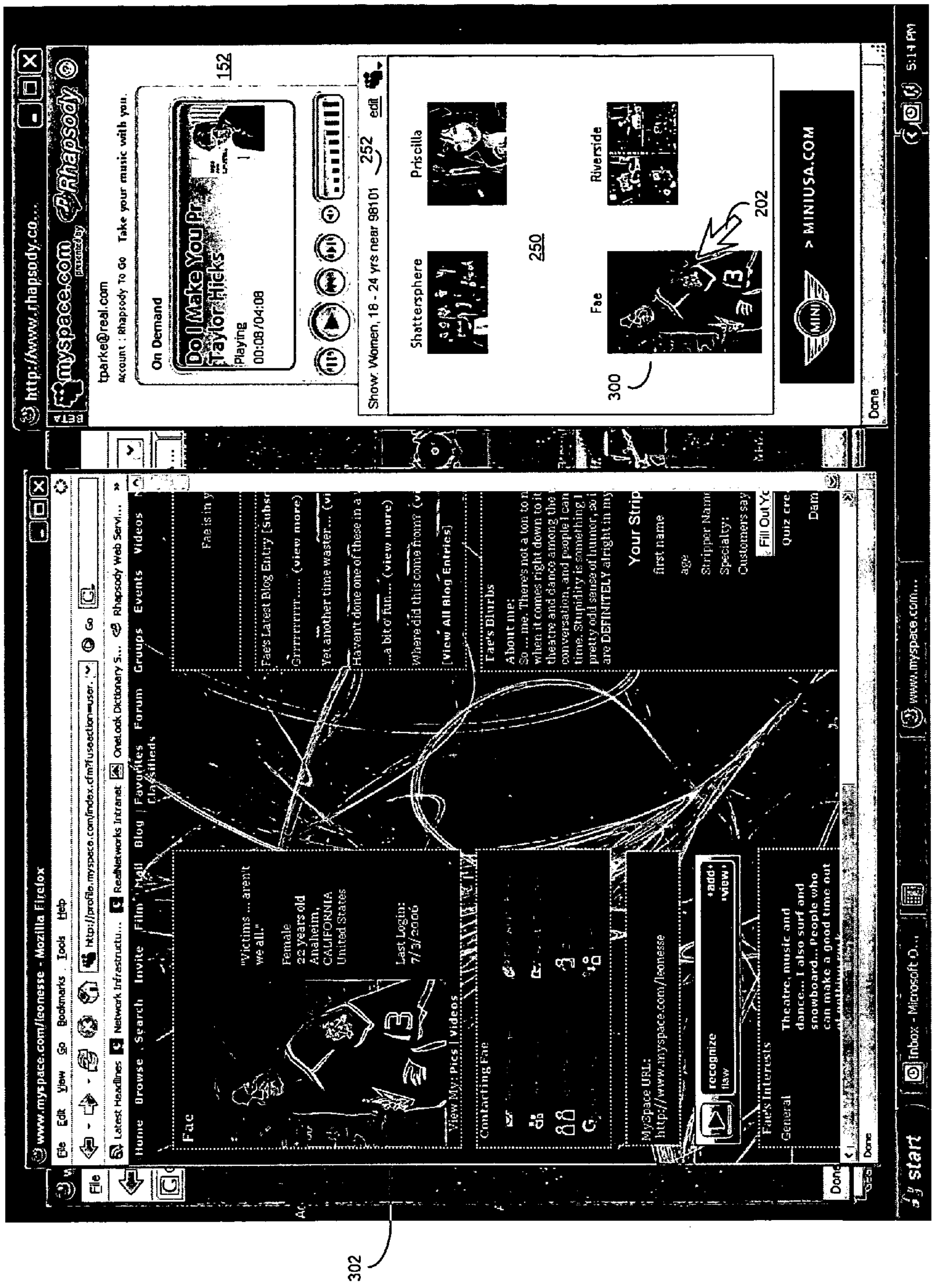
FIG. 7 is a diagrammatic view of a screen rendered by the automated searching process and/or client application of FIG. 1.

Referring also to FIG. 7, if user 20 is interested in learning additional information concerning one or more members (e.g., member "Fae" 300), user 20 may select "Fae" (using screen pointer 202) to retrieve a profile 302 of member "Fae" 302.

A number of implementations have been described. Nevertheless, it will be understood that various modifications may be made. Accordingly, other implementations are within the scope of the following claims.

What is claimed is:

1. A computer implemented method for automatically generating a result set comprising:

monitoring, via a computing device, one or more actions taken by a user while browsing a website, wherein at least one of the actions includes rendering a media data file;

automatically assigning, via the computing device, one or more search terms to each of the one or more actions taken by the user based upon, at least in part, metadata associated with a media data file, the media data file associated with said one or more actions, thus defining one or more initial search terms, wherein at least one of the actions includes rendering a media data file;

executing, via the computing device, an initial query on a datastore based on at least a portion of the one or more initial search terms to generate an initial result set, the initial result set including at least one of: an object, related to an artist associated with the media data file, offered for bid/sale on the website, a news article related to the artist, and a member of a social community website; and presenting the initial result set to the user of the website.

2. The computer implemented method of claim 1 wherein the one or more actions taken by the user are chosen from the group consisting of: uploading a data file; downloading a data file; posting an article; reviewing an article; posting a message; reviewing a message; executing a query; purchasing a product; offering a product for sale; purchasing a service; and offering a service for sale.

3. The computer implemented method of claim 1 wherein the website is chosen from the group consisting of: a news website; a weblog website; an auction website; an ecommerce website; a dating/matchmaking website; a special interest website; a search engine/internet portal website; and a social networking website.

4. The computer implemented method of claim 1 further comprising: filtering the initial result set in accordance with filtering criteria defined by the user.

5. The computer implemented method of claim 4 wherein filtering the result set includes: supplementing the one or more initial search terms with one or more user-defined search terms; executing a filtering query based on at least a portion of the one or more user-defined search terms to generate a filtered result set; and presenting the filtered result set to the user of the website.

6. The computer implemented method of claim 1 wherein the datastore includes one or more of: a database servable by a computing device; and a system memory accessible by a computing device.

7. A computer program product residing on a computer readable medium having a plurality of instructions stored thereon that, when executed by a processor, cause the processor to perform operations comprising:

monitoring one or more actions taken by a user while browsing a website, wherein at least one of the actions includes rendering a media data file;

automatically assigning one or more search terms to each of the one or more actions taken by the user based upon, at least in part, metadata associated with a media data file, the media data file associated with said one or more actions, thus defining one or more initial search terms, wherein at least one of the actions includes rendering a media data file;

executing an initial query on a datastore based on at least a portion of the one or more initial search terms to generate an initial result set, the initial result set including at least one of: an object, related to an artist associated with the media data file, offered for bid/sale on the website, a news article related to the artist, and a member of a social community website; and presenting the initial result set to the user of the website.

8. The computer program product of claim 7 wherein the one or more actions taken by the user are chosen from the group consisting of:

uploading a data file; downloading a data file; posting an article; reviewing an article; posting a message; reviewing a message; executing a query; purchasing a product; offering a product for sale; purchasing a service; and offering a service for sale.

9. The computer program product of claim 7 wherein the website is chosen from the group consisting of: a news website; a weblog website; an auction website; an ecommerce website; a dating/matchmaking website; a special interest website; a search engine/internet portal website; and a social networking website.

10. The computer program product of claim 7 further comprising instructions for performing operations comprising: filtering the initial result set in accordance with filtering criteria defined by the user.

11. The computer program product of claim 10 wherein the instructions for filtering the result set include instructions for performing operations comprising: supplementing the one or more initial search terms with one or more user-defined search terms; executing a filtering query based on at least a portion of the one or more user-defined search terms to generate a filtered result set; and presenting the filtered result set to the user of the website.

12. The computer program product of claim 7 wherein the datastore includes one or more of: a database servable by a computing device; and a system memory accessible by a computing device.

13. A computing device configured to perform operations comprising:

monitoring one or more actions taken by a user while browsing a website, wherein at least one of the actions includes rendering a media data file;

automatically assigning one or more search terms to each of the one or more actions taken by the user based upon, at least in part, metadata associated with a media data file, the media data file associated with said one or more actions, thus defining one or more initial search terms, wherein at least one of the actions includes rendering a media data file;

executing an initial query on a datastore based on at least a portion of the one or more initial search terms to generate an initial result set, the initial result set including at least one of: an object, related to an artist associated with the media data file, offered for bid/sale on the website, a news article related to the artist, and a member of a social community website; and presenting the initial result set to the user of the website.

14. The computing device of claim 13 wherein the one or more actions taken by the user are chosen from the group consisting of: uploading a data file; downloading a data file; posting an article; reviewing an article; posting a message; reviewing a message; executing a query; purchasing a product; offering a product for sale; purchasing a service; and offering a service for sale.

15. The computing device of claim 13, wherein the website is chosen from the group consisting of: a news website; a weblog website; an auction website; an ecommerce website; a dating/matchmaking website; a special interest website; a search engine/internet portal website; and a social networking website.

16. The computing device of claim 13, wherein the computing device is further configured to perform operations comprising: filtering the initial result set in accordance with filtering criteria defined by the user.

17. The computing device of claim 16 wherein filtering the result set includes: supplementing the one or more initial search terms with one or more user-defined search terms; executing a filtering query based on at least a portion of the one or more user-defined search terms to generate a filtered result set; and presenting the filtered result set to the user of the website.

18. The computing device of claim 13 wherein the datastore includes one or more of: a database servable by the computing device; and a system memory accessible by the computing device.

19. The computer implemented method of claim 1 wherein the metadata comprises at least one of an artist and a track.

20. The computer program product of claim 7 wherein the metadata comprises at least one of an artist and a track.

* * * * *